United States Patent [19]
Kohaut

[11] 3,995,102
[45] Nov. 30, 1976

[54] INSERT DEVICE FOR CABLES
[75] Inventor: John E. Kohaut, West Orange, N.J.
[73] Assignee: Raceway Components, Inc., Nutley, N.J.
[22] Filed: Jan. 25, 1974
[21] Appl. No.: 436,500

[52] U.S. Cl. .................................. 174/48; 52/232; 169/48
[51] Int. Cl.² ..................... H02G 3/22; A62C 3/16
[58] Field of Search ................ 174/48, 48, 57; 52/1, 52/232, 220, 221, 317; 220/88 R; 310/88; 252/8.1, 378 R; 169/48, 49, 46

[56] References Cited
UNITED STATES PATENTS

| | | | |
|---|---|---|---|
| 1,869,841 | 8/1932 | Buchanan | 174/57 |
| 2,279,791 | 4/1942 | Lamb | 169/48 |
| 3,318,476 | 5/1967 | Clark | 174/57 X |
| 3,336,153 | 8/1967 | Juda | 220/88 R |
| 3,455,850 | 7/1969 | Saunders | 252/378 R |
| 3,751,576 | 8/1973 | Klinkman et al. | 174/48 |
| 3,803,341 | 4/1974 | Klinkman et al. | 174/48 |
| 3,864,883 | 2/1975 | McMarlin | 52/221 |

Primary Examiner—J. V. Truhe
Assistant Examiner—David A. Tone
Attorney, Agent, or Firm—Sommers & Sommers

[57] ABSTRACT

This invention relates to an insert device for cables adapted to be positioned in structural openings, such as, for example in holes drilled into or formed in floors and other planar surfaces of structures such as buildings, to facilitate connection of power lines, cables and wires from a source into a cable receiving junction box at the underside of the floor and through the insert device and thence to a service head at the upper face of the floor, for connection of various accessory devices thereto, fire retarding means being provided to seal the device in said floor opening and to seal said cables therein, said fire retarding means automatically foaming to effectuate the sealing action described, on occurrence of fire or excessive temperatures, to effectively so seal the assembly. The cables on such occurrence, are thus sealed in said insert device in air-tight, spaced relation to each other; spread of fire and excess heat therethrough will be automatically prevented, and the fire protective rating of the floor wherein the insert device is so mounted and used will be substantially equivalent to the original rating of the floor.

16 Claims, 9 Drawing Figures

INSERT DEVICE FOR CABLES

BACKGROUND OF THE INVENTION

This invention generally relates to cable conduit devices and more particularly to inserts for use in connection with concrete and other floors, for passage of power, telephone, signal and other cables from a junction box to a service head, facilitating easy connection of telephone, electrical and other apparatus thereto. Various forms of cable conduits have been proposed and are in use; such devices are objectionable for a number of reasons. In one form of such device, nipples are run through the outlet box and into the service fitting. In the case of fire, the nipples act as a raceway for heat and flame. Prior devices have been further objectionable in that they have not met the requirements of underwriters and local building requirements as they did not provide effective heat and flame barriers and constituted a serious fire hazard.

The device of this invention overcomes the foregoing and other objections to devices of the prior art and further provides features of construction and adjustment enabling the device to be manufactured in standard form adaptable for use in openings of various depths. In pre-set and after-set applications the device may be used with assurance that it will completely and effectively seal and fireproof cables passed therethrough as well as the floor opening wherein the device is positioned, against passage of excess heat and flames. The outlet box and service head in the device of the invention are connectable adjustably to conform to varying depths thickness of openings in the floors, in a simple and highly efficient, rugged and durable manner.

DESCRIPTION OF THE DRAWINGS

The invention is diagrammatically illustrated, by way of example, in the appended drawings, wherein similar reference characters indicate like parts and wherein.

DESCRIPTION OF THE PREFERRED EMBODIMENT

Figure 1:
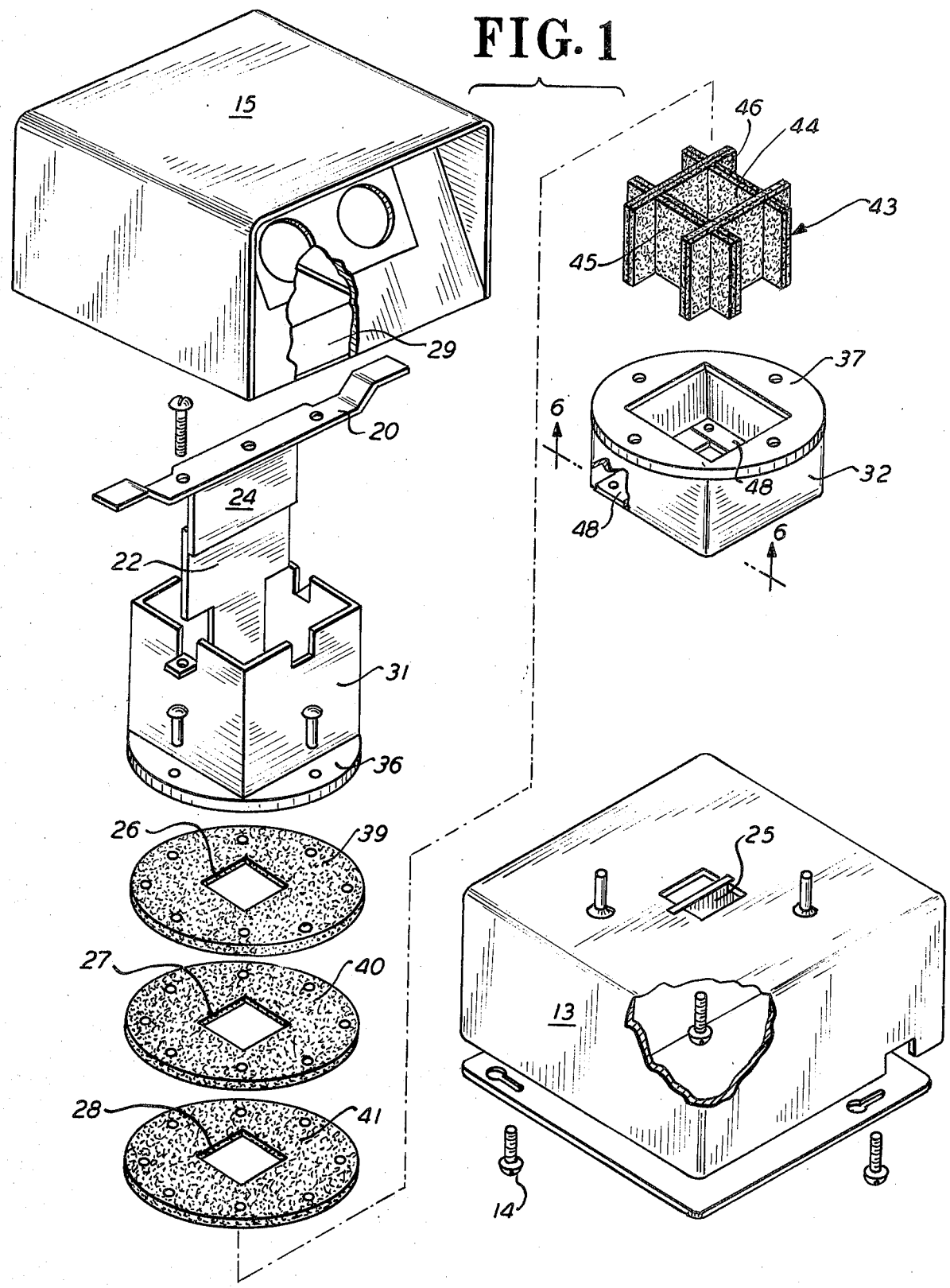
FIG. 1 is an exploded, partly fragmentary perspective view of an insert device for conduits embodying the invention, with the parts thereof shown positioned intermediate the junction box and service head.
Figure 4:
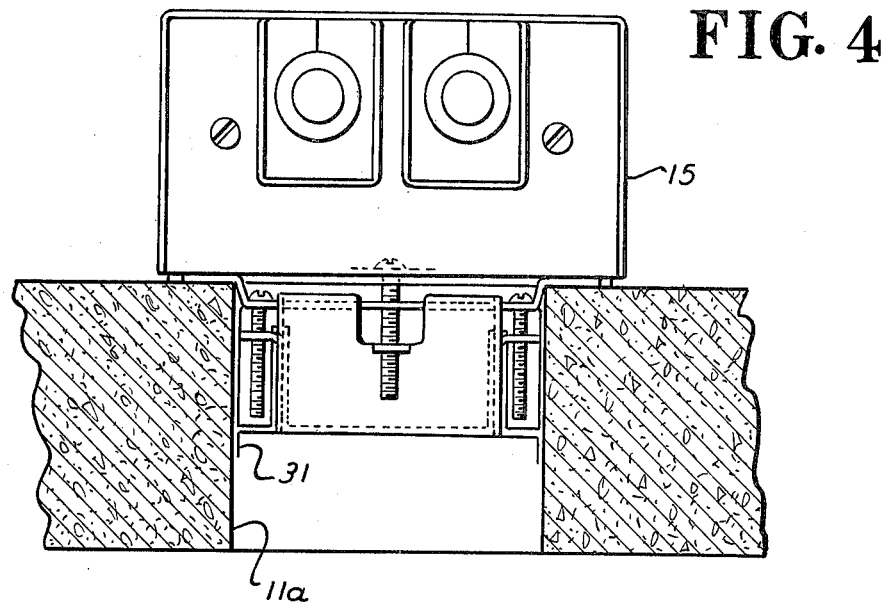
FIG. 4 is a similar side elevational view, on a smaller scale, of an insert device embodying the invention, shown for use in an opening of lesser thickness than that shown in FIG. 3.
Figure 5:
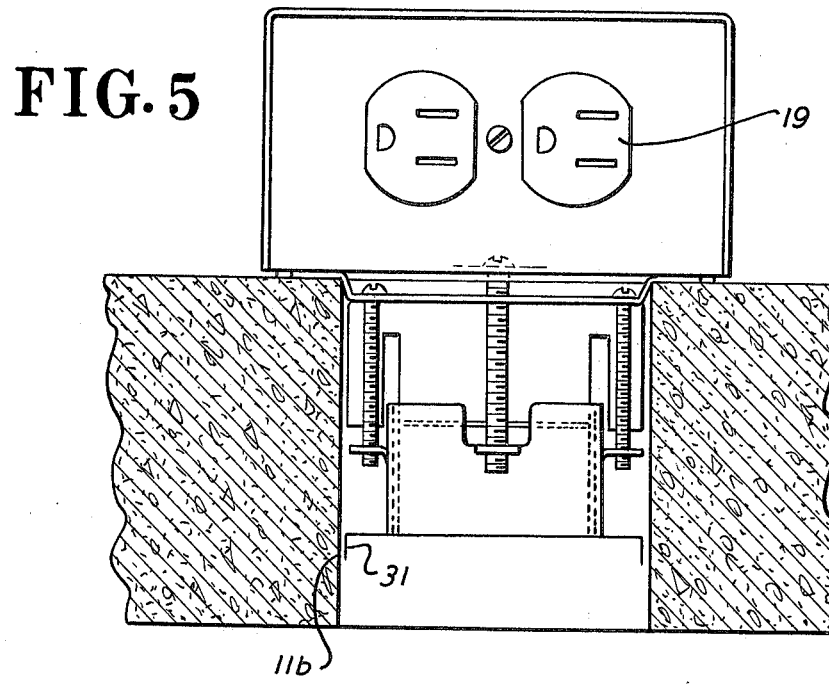
FIG. 5 is a similar view, on the smaller scale, showing the insert device for use in an opening of greater thickness.
Figure 6:
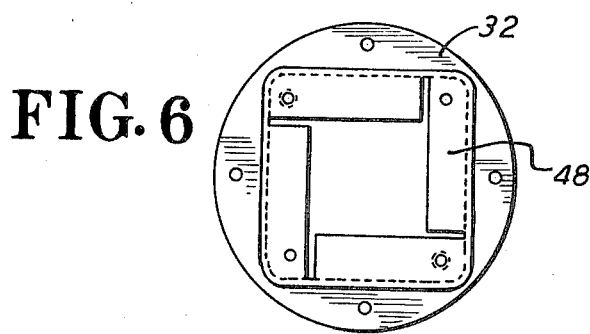
FIG. 6 is a bottom plan view of the lower section of the insert device, taken at line 6—6 of FIG. 1.

The invention comprises an insert device 10 adapted (FIG. 2) to be positioned in a structural opening, such as the opening 11 in structure 12, which may be a floor, for example, in a building, said floor being formed by any suitable means, such as by setting of hardening material in forms in which the insert device 10 may be positioned in the "preset" form in initial construction, within a suitable waterproofing envelope in the floor so formed. The insert device 10 serves the function of providing a means for passage of cables, wires and the like through a junction box 13, which may be connected to the insert device by suitable bolt or other means 14 (FIG. 2) said cables or wires passing upwardly through the insert device and into a service head 15, which may be connected to the insert device by suitable means such as bolts 16. The cables or wires may thus be passed through the junction box 13 from a remote source and thence through the insert device and to the service head, where the cables may be connected as by means of the posts 18 to receptacles in the service head or passed through grommets or other openings 17 (FIG. 2) in the service head; they may be electrically connected to receptacles or other plug receiving members 19 (FIG. 5). The insert device may be directly or indirectly connected to the service head by suitable means, for example, by a strap bar 20 (FIGS. 1 and 2) for receiving bolts or other means to connect the service head flanges 21 (FIG. 2) or other internally threaded or other complementary connector means in the insert device 10 and to flanges 29 (FIG. 1) of the service head. The insert housing is provided with an upstanding barrier 22 (FIGS. 1 and 2) which may be secured thereto in any desired or convenient manner and the service head may be provided with a depending barrier 23 (FIG. 2) for complementary sliding registration with the barrier segment 24 depending from the strap bar 20 also complementing the barrier 22 in the insert device 10. The junction box 13 may be provided with a barrier 25 for endwise abutting or other registration with the barrier 22 when the parts are assembled (FIG. 2) thus providing an essentially continuous barrier (FIG. 2) 25, 22, 24 and 23 throughout the adjustable range of the parts. The insert device 10 (FIG. 1) may be formed of upper and lower sections 31, 32 provided with flanges 36, 37 for connection by bolts or other axially adjustable connectors, to facilitate connection of the parts and adjustment thereof to accommodate use thereof in structural openings, such as shown at 11 (FIG. 2) and in openings such as shown at 11a and 11b (FIGS. 4 and 5) of different thicknesses. The barriers above described divide the insert device, junction box and service head into compartments in which different use-serving or kinds of wire or cables — for example, high and low voltage wires-may be respectively passed in separately shielded and isolated electrical or otherwise relation. The FIG. 2 form of the invention is an "after set" form wherein the device is provided with means for fire retarding the device in opening 11. In that form upper and lower insert device sections 31, 32 are provided with complementarily formed flanges 36, 37, fire retarding means being positioned therebetween. Said fire retarding means may (FIGS. 1 and 2) comprise discs or plates 39, 40, 41 positioned intermediate the sections of the device (FIG. 2) by bolt or other means 42. In the case of fire or elevated temperatures the fire retarding discs foam and expand into the aperture 11, sealing the same and thereby effectively preventing flame or elevated temperatures from passing through. This important automatic fire prevention feature of the invention prevents passage of fire or elevated temperatures through the floor of the structure in which the insert device is positioned. The fire retarding discs are preferably made of material which will automatically expand and foam under pressure when exposed to fire or to substantially highly elevated temperatures. A material we have found highly suitable for that purpose is water glass, which foams and creates tremendous pressures on occurrence of fire or highly elevated temperatures, the foam flowing into all voids between the insert device and the structural opening 11, thus isolating the device in the floor and providing a barrier, effectively preventing the passage of flame and excess temperatures therethrough. The water glass material described is inorganic hydrated sodium silicate. At about 200° C., the water-vapor escapes, to leave a solid, fine-porous, uncracked and thermally insulating layer of foamed material, having a density of 0.1 to 0.2 g/m$^3$. It is a compound of sodium, silicon, hydrogen and oxygen.

Figure 2:
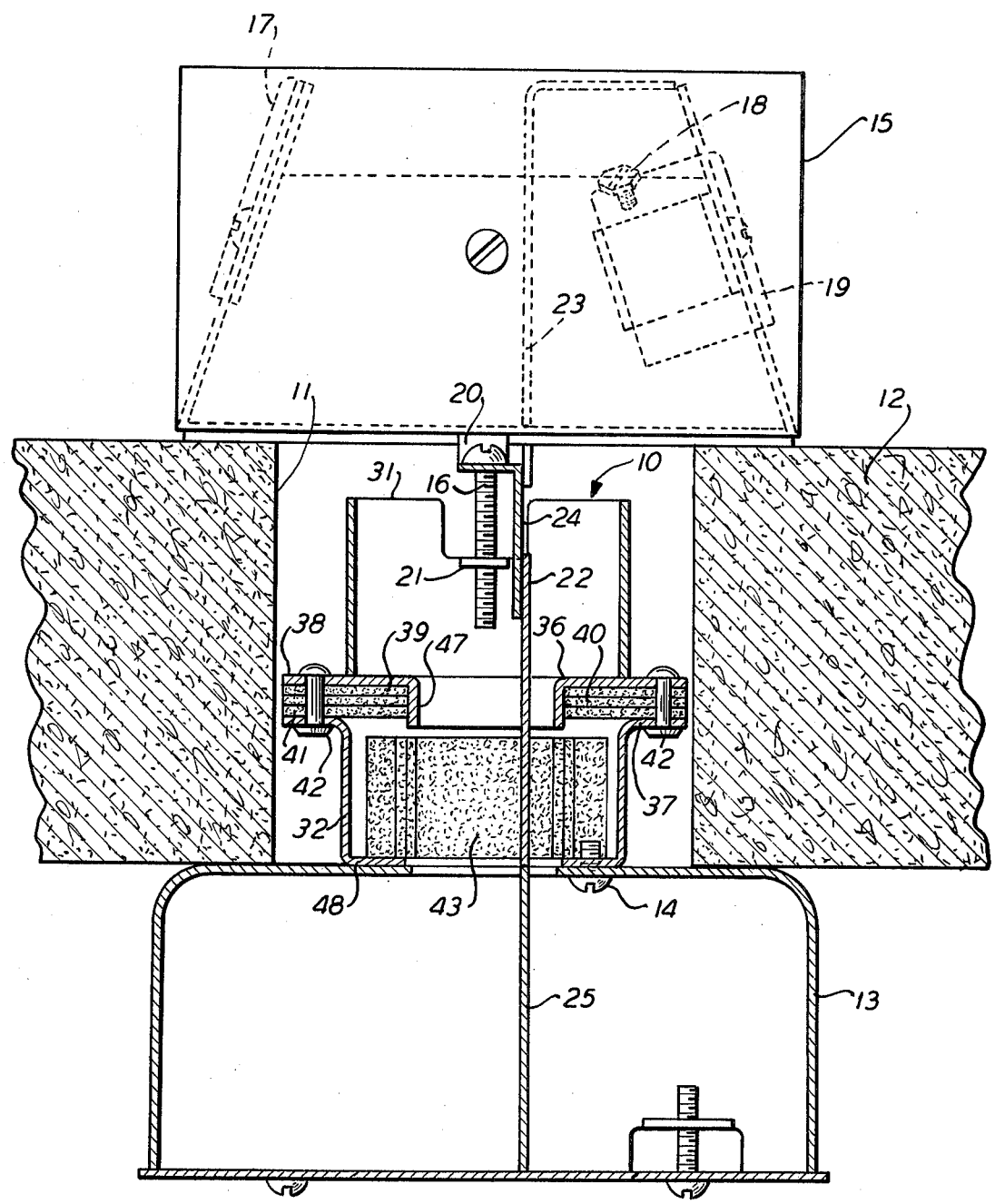
FIG. 2 is a vertical sectional view of a structural opening in which the device embodying the invention is shown positioned with the junction box and service head shown disposed against and in closing relation to the opposite faces thereof.
Figure 3:
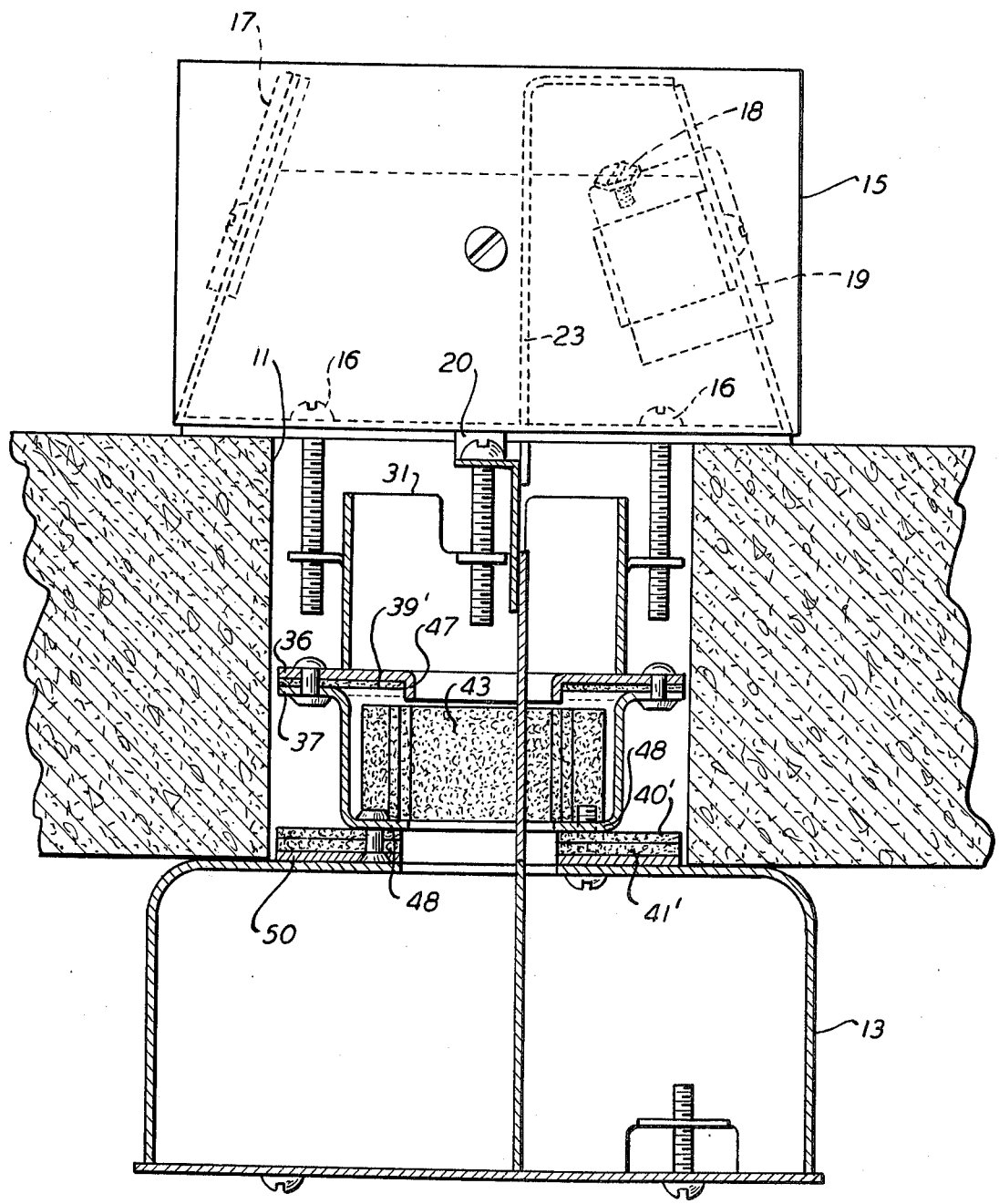
FIG. 3 is a similar view of another form thereof.

A further feature of the invention comprises providing a fire retarding member 43 (FIGS. 1 and 2) of criss-cross cross section, defining therein parallel passageways 44, 45 and 46, for passage therethrough of cables in aligned relation to the other parts of the device as above described. To that end the opening 44 of fire retarding member 43 is in alignment with opposite sides of the barrier 22 with which a plurality of discs such as 39, 40, 41 may have registration engagement on assembly of the device (FIG. 2). For further alignment of the parts the upper section 31 of the insert device is preferably provided with a medially formed downwardly depending rim 47 (FIG. 2) with which the discs 39, 40, 41 may have registration engagement. The member 43 may be positioned on flanges 48 (FIGS. 1 and 2) inwardly depending from the bottom of the lower section 32 of the insert device (FIGS. 2 and 3) and defining an opening for the passage of cables and wires.

As shown in FIG. 2, the fire retarding member 43 may be positioned on said rim 48 of the lower section 32 of the insert device 10 and the cables passed therethrough; upon occurrence of highly elevated temperatures, the fire retarding member 43 will expand and foam and will fill the spaces between and around the cables and interior of the insert device, forming an essentially solid and closed lower section 32 in the insert device, which will retard passage of excess heat or fire therethrough. The material of which the fire retarding member 43 may be made may be water glass having the properties above described in connection with the discs 39, 40, 41 which further seal the opening 11. In the form shown in FIG. 3 a single disc 39' (instead of the plurality) is used intermediate the flanges 36, 37 of the lower and upper sections of the insert device. If desired, further discs 40', 41' foaming and expanding upon the occurrence of heat, fire or elevated temperatures, may (FIG. 3) be positioned intermediate the disc 50 and flanged rim 48 of the lower section of the insert device, to further seal the insert device in the the opening 11. While I have shown the fire retarding member 43 of open web, criss-cross, cross section, for simplicity of manufacture assembly and use it may be of that or any other desired or convenient contour or cross sectional configuration; the number of passageways provided therein likewise may be varied to conform to the requirements of particular uses, as may also the number of barriers and their position in the insert device 10 for the uses and purposes above described. A disc 50 (FIG. 3) may be positioned intermediate the insert device and the junction box 13 and may be provided with an upstanding registration hub 51 which may be equal to or of smaller cross section than the medial opening in 44 of member 43. The fire retarding discs 39, 40, 41 may (FIG. 1) be provided with medial apertures 26, 27, 28 for passage of cables and wires etc. therethrough. Disc 50 may be metal or other suitable material.

Figure 7:
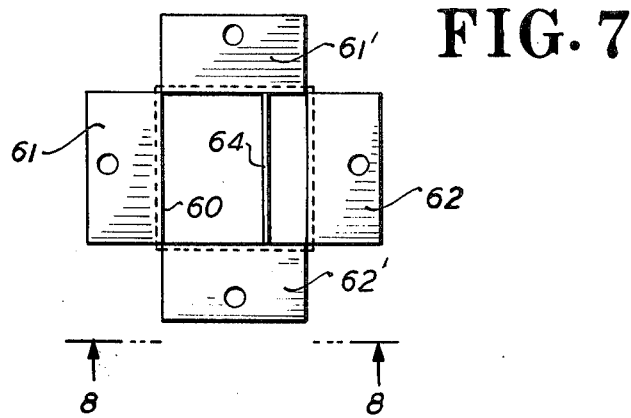
FIG. 7 is a top plan view of an extender for the insert device.
Figure 8:
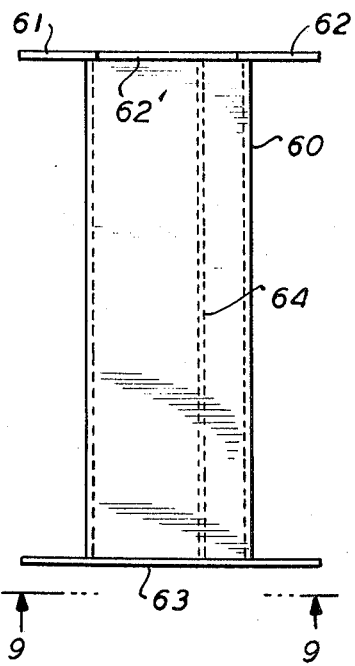
FIG. 8 is a side elevational view thereof, taken at line 8—8 of FIG. 7.
Figure 9:
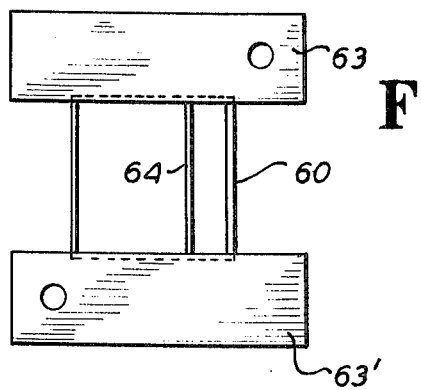
FIG. 9 is a bottom plan view thereof, taken at line 9—9 of FIG. 8.

The features of the device of the invention above recited and features shown in the drawings adapt the device for use with equal efficacy in connection with openings of various depths provided in structures. Thus, in FIGS. 4 and 5, the device is shown used in connection with openings 11a and 11b, respectively of less and of greater depth, than the opening 11 shown in FIG. 1. An extender 60 (FIGS. 7–9) including top flanges 61', 61', 62 and 62', bottom flanges 63 and 63', and a barrier 64, may be secured intermediate the junction box 13 and the rim 48 of the lower section 32 of the insert device 10 by bolt or other means to enable installation of the insert device 10 in floors formed of hardening material of thickness greater than standard floor thickness. The number of fire retarding discs may likewise be greater or smaller than the three (39, 40, 41) shown in FIG. 1 and the two (40', 41') shown in FIG. 3.

While the present invention has been particularly set forth in terms of specific embodiments thereof, it will be understood, in view of the instant disclosure, that variations may be made by those skilled in the art within the scope of the invention and disclosure. The invention is thus to be broadly construed within the scope and spirit of the appended claims.

I claim:

1. An insert device to be positioned in a structural opening, said opening having spaced apart ends, for connection of cables from a cable source, through the insert device and to a service head positioned across an end of the structural opening, said insert device comprising:
   a. an insert housing proportioned to be positioned in said structural opening;
   b. said housing comprising a plurality of sections;
   c. fire retarding means positioned intermediate said housing sections and separating the same;
   d. means connecting said housing sections and positioning said fire retarding means intermediate and separating the sections;
   e. said fire retarding means foaming on occurrence of excess heat or fire, to expand and seal said housing sections in the structural opening.

2. In an insert device as set forth in claim 1, said fire retarding means being apertured for passage of cables therethrough, and so foaming on occurrence of excess heat or fire to close said cable receiving apertured portion and to seal said cables in the housing.

3. In an insert device to be positioned in a structural opening as set forth in claim 1, flange portions on said housing sections, said fire retarding means being so secured to and positioned intermediate said flange portions and so separating said housing sections.

4. In an insert device to be positioned in an opening as recited in claim 1,
said fire retarding means comprising disc means so positioned intermediate said housing sections and apertured for passage of cables therethrough, and so foaming on occurrence of excess heat or fire, to expand and close said apertured portion thereof, to seal said cables in the housing.

5. In an insert device as set forth in claim 1, said fire retarding means comprising plate means.

6. In an insert device to be positioned in a structural opening, as set forth in claim 1,
said fire retarding means so positioned intermediate the housing sections extending partially outwardly thereof, and partially interiorly thereof for passage of cables therethrough,
said fire retarding means, on so expanding, also sealing the cables in the insert device housing sections.

7. In an insert device to be positioned in a structural opening as set forth in claim 1,
said fire retarding means, so positioned intermediate the housing sections, extending partially outwardly thereof and partially interiorly thereof, and being medially open, for passage of cables therethrough,
said fire retarding means, on so expanding, also sealing the cables in the housing sections.

8. An insert device to be positioned in a structural opening, said opening having spaced apart ends, for connection of cables from a cable source, through the insert device and to a service head positioned across an end of the structural opening, said insert device comprising:
a. an insert housing proportioned to be positioned in said structural opening,
b. said housing comprising a plurality of sections,
c. fire retarding means positioned intermediate said housing sections and separating the same,
d. means passing through said housing sections with said fire retarding means intermediate the same and connecting said sections together with said fire retarding means therebetween, and
e. said fire retarding means foaming on occurrence of excess heat or fire, to expand and seal said housing sections in the structural opening.

9. In an insert device to be positioned in a structural opening as set forth in claim 8,
flanges on said housing sections extending exteriorly thereof,
said fire retarding means being so positioned intermediate said flanges and so separating the housing sections and being so secured intermediate the flanges.

10. An insert device to be positioned in a structural opening, said opening having spaced apart ends, for connection of cables from a cable source, through the insert device and to a service head positioned across an end of the structural opening, said insert device comprising:
a. an insert housing proportioned to be positioned in said structural opening;
b. fire retarding means comprising an axially elongated member of criss-cross transverse cross section positioned in said housing and having a medial axially elongated opening therethrough, for passage of cables therethrough,
c. said fire retarding means foaming on occurrence of heat or fire, to expand and seal said cables in said housing.

11. In an insert device to be positioned in a structural opening, said opening having spaced apart ends, for connection of cables from a cable source, through the insert device and to a service head positioned across an end of the structural opening, said insert device comprising:
a. an insert housing proportioned to be positioned in said structural opening;
b. fire retarding means positioned in said housing comprising an axially elongated member of criss-cross transverse cross-section, formed with an elongated axial opening therein, for passing cables therethrough;
c. said fire retarding means foaming on occurrence of excess heat or fire, to expand and seal said cables in the housing.

12. In an insert device to be positioned in a structural opening, as set forth in claim 11,
said insert housing comprising sections,
second fire retarding means positioned intermediate said housing sections and separating the same,
means connecting said housing sections with said second fire retarding means intermediate the same,
said second fire retarding means foaming on occurrence of excess heat or fire, to expand and seal said housing sections in the structural opening.

13. In an insert device to be positioned in a structural opening, as set forth in claim 11,
said insert housing comprising sections,
second fire retarding means secured to said housing sections and extending outwardly therefrom,
said second fire retarding means foaming on occurrence of excess heat or fire, to expand and seal said housing sections in the structural opening.

14. In an insert device to be positioned in a structural opening, as set forth in claim 11,
an upstanding barrier secured to said insert housing and registering with and depending into said elongated axial medial opening of said fire retarding member and dividing said opening into separate cable passages therethrough.

15. In an insert device to be positioned in a structural opening, as set forth in claim 11,
said criss-cross member including a center portion and a projection secured to and extending angularly outwardly of said center portion of said fire retarding member, substantially co-extensive with the length of said portion,
said projection so expanding and so sealing said cables and fire retarding member in the housing on such occurrence of excess heat or fire.

16. In an insert device to be positioned in a structural opening, as set forth in claim 11,
said criss-cross member including a center portion and a plurality of projections secured to and extending angularly outwardly of said center portion of fire retarding member, in spaced relation to each other and so expanding and so sealing said fire retarding member and cables in the housing on such occurrence of excess heat or fire.

* * * * *

REEXAMINATION CERTIFICATE (397th)
United States Patent [19]
Kohaut

[11] B1 3,995,102
[45] Certificate Issued    Oct. 8, 1985

[54] INSERT DEVICE FOR CABLES
[75] Inventor: John E. Kohaut, West Orange, N.J.
[73] Assignee: Raceway Components, Inc., Nutley, N.J.

Reexamination Request:
No. 90/000,635, Sep. 21, 1984

Reexamination Certificate for:
Patent No.: 3,995,102
Issued: Nov. 30, 1976
Appl. No.: 436,500
Filed: Jan. 25, 1974

[51] Int. Cl.[4] .......................... H02G 3/22; A62C 3/16
[52] U.S. Cl. ...................................... 174/48; 52/232; 169/48
[58] Field of Search ........................................ 174/48
[56] References Cited

U.S. PATENT DOCUMENTS

| | | |
|---|---|---|
| 117,546 | 8/1871 | Kibler . |
| 283,789 | 0/1883 | Kelly . |
| 3,255,559 | 6/1966 | Gaeth et al. ........................ 52/232 |

OTHER PUBLICATIONS

*Fire Tests of Poke-Thru Assemblies* by M. S. Abrams & A. H. Gustaferro, Published by the Portland Cement Association 1971. (Referred to in the Request as the PCA REPORT.)

*Primary Examiner*—Laramie E. Askin
*Assistant Examiner*—David A. Tone
*Attorney, Agent, or Firm*—Howard N. Sommers

[57]    ABSTRACT

This invention relates to an insert device for cables adapted to be positioned in structural openings, such as, for example in holes drilled into or formed in floors and other planar surfaces of structures such as buildings, to facilitate connection of power lines, cables and wires from a source into a cable receiving junction box at the underside of the floor and through the insert device and thence to a service head at the upper face of the floor, for connection of various accessory devices thereto, fire retarding means being provided to seal the device in said floor opening and to seal said cables therein, said fire retarding means automatically foaming to effectuate the sealing action described, on occurrence of fire or excessive temperatures, to effectively so seal the assembly. The cables on such occurrence, are thus sealed in said insert device in air-tight, spaced relation to each other; spread of fire and excess heat therethrough will be automatically prevented, and the fire protective rating of the floor wherein the insert device is so mounted and used will be substantially equivalent to the original rating of the floor.

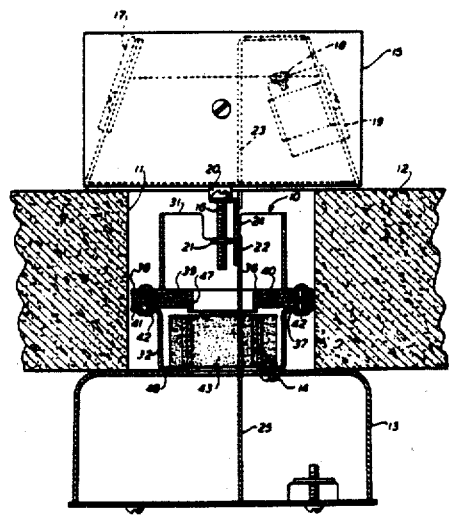

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-16 is confirmed.

* * * * *